(12) United States Patent
Parsche

(10) Patent No.: US 9,328,243 B2
(45) Date of Patent: May 3, 2016

(54) CARBON STRAND RADIO FREQUENCY HEATING SUSCEPTOR

(71) Applicant: HARRIS CORPORATION, Melbourne, FL (US)

(72) Inventor: Francis Eugene Parsche, Palm Bay, FL (US)

(73) Assignee: HARRIS CORPORATION, Melbourne, FL (US)

( * ) Notice: Subject to any disclaimer, the term of this patent is extended or adjusted under 35 U.S.C. 154(b) by 671 days.

(21) Appl. No.: 13/693,925

(22) Filed: Dec. 4, 2012

(65) Prior Publication Data

US 2013/0096039 A1   Apr. 18, 2013

Related U.S. Application Data

(62) Division of application No. 13/414,096, filed on Mar. 7, 2012, now Pat. No. 8,337,769, which is a division of application No. 12/396,021, filed on Mar. 2, 2009, now Pat. No. 8,133,384.

(51) Int. Cl.
*H01B 1/04* (2006.01)
*C08L 95/00* (2006.01)
(Continued)

(52) U.S. Cl.
CPC . *C08L 95/00* (2013.01); *C10G 1/00* (2013.01); *C10G 1/02* (2013.01); *H05B 6/80* (2013.01); *H05B 2214/03* (2013.01)

(58) Field of Classification Search
CPC .............. H01B 1/24; H01B 1/04; H05B 6/62; H05B 6/64; H05B 5/54; H05B 6/80
USPC ............ 252/502, 500; 208/108, 215; 219/764
See application file for complete search history.

(56) References Cited

U.S. PATENT DOCUMENTS 2,371,459 A   3/1945   Mittelmann
2,685,930 A   8/1954   Albaugh
(Continued)

FOREIGN PATENT DOCUMENTS

CA   1075888   4/1980
CA   1199573   1/1986
(Continued)

OTHER PUBLICATIONS

Butler, R.M. "Theoretical Studies on the Gravity Drainage of Heavy Oil During In-Situ Steam Heating", Can J. Chem Eng, vol. 59,1981, pp. 1-6.
(Continued)

*Primary Examiner* — Nina Bhat
(74) *Attorney, Agent, or Firm* — Allen, Dyer, Doppelt, Milbrath & Gilchrist, P.A.

(57) ABSTRACT

A method and apparatus are directed to heating materials by application of radio frequency ("RF") energy. The materials to be heated may include petroleum ore, such as bitumen, oil sands, oil shale, tar sands, or heavy oil. Petroleum ore is mixed with a substance that includes mini-dipole susceptors such as carbon strands. A source is provided which applies RF energy to the mixture of a power and frequency sufficient to heat the mini-dipole susceptors. The RF energy is applied for a sufficient time to allow the mini-dipole susceptors to heat the mixture to an average temperature greater than about 212° F. (100° C.). Optionally, the mini-dipole susceptors can be removed after the desired average temperature has been achieved. The susceptors may provide advantages for the RF heating of hydrocarbons, such as higher temperatures (sufficient for distillation or pyrolysis), anhydrous processing, and greater speed or efficiency.

29 Claims, 1 Drawing Sheet

(51) Int. Cl.
   *C10G 1/00*   (2006.01)
   *C10G 1/02*   (2006.01)
   *H05B 6/80*   (2006.01)

(56) References Cited

U.S. PATENT DOCUMENTS

| | | |
|---|---|---|
| 3,497,005 A | 2/1970 | Pelopsky |
| 3,728,117 A | 4/1973 | Heidenhain |
| 3,848,671 A | 11/1974 | Kern |
| 3,954,140 A | 5/1976 | Hendrick |
| 3,988,036 A | 10/1976 | Fisher |
| 3,991,091 A | 11/1976 | Driscoll |
| 4,035,282 A | 7/1977 | Stuchberry et al. |
| 4,042,487 A | 8/1977 | Seguchi |
| 4,087,781 A | 5/1978 | Grossi et al. |
| 4,136,014 A | 1/1979 | Vermeulen |
| 4,140,179 A | 2/1979 | Kasevich et al. |
| 4,140,180 A | 2/1979 | Bridges et al. |
| 4,144,935 A | 3/1979 | Bridges et al. |
| 4,146,125 A | 3/1979 | Sanford et al. |
| 4,196,329 A | 4/1980 | Rowland et al. |
| 4,295,880 A | 10/1981 | Horner |
| 4,300,219 A | 11/1981 | Joyal |
| 4,301,865 A | 11/1981 | Kasevich et al. |
| 4,313,648 A | 2/1982 | Yano |
| 4,328,324 A | 5/1982 | Kock |
| 4,373,581 A | 2/1983 | Toellner |
| 4,396,062 A | 8/1983 | Iskander |
| 4,404,123 A | 9/1983 | Chu |
| 4,410,216 A | 10/1983 | Allen |
| 4,425,227 A | 1/1984 | Smith |
| 4,449,585 A | 5/1984 | Bridges et al. |
| 4,456,065 A | 6/1984 | Heim |
| 4,457,365 A | 7/1984 | Kasevich et al. |
| 4,470,459 A | 9/1984 | Copland |
| 4,485,869 A | 12/1984 | Sresty |
| 4,487,257 A | 12/1984 | Dauphine |
| 4,508,168 A | 4/1985 | Heeren |
| 4,514,305 A | 4/1985 | Filby |
| 4,524,827 A | 6/1985 | Bridges |
| 4,531,468 A | 7/1985 | Simon |
| 4,583,586 A | 4/1986 | Fujimoto et al. |
| 4,613,375 A * | 9/1986 | Forster .................. C25C 3/125 106/284.05 |
| 4,620,593 A | 11/1986 | Haagensen |
| 4,622,496 A | 11/1986 | Dattili |
| 4,645,585 A | 2/1987 | White |
| 4,678,034 A | 7/1987 | Eastlund |
| 4,703,433 A | 10/1987 | Sharrit |
| 4,778,237 A | 10/1988 | Sorin |
| 4,790,375 A | 12/1988 | Bridges |
| 4,817,711 A | 4/1989 | Jeambey |
| 4,882,984 A | 11/1989 | Eves, II |
| 4,892,782 A | 1/1990 | Fisher et al. |
| 4,895,790 A | 1/1990 | Swanson |
| 5,046,559 A | 9/1991 | Glandt |
| 5,055,180 A | 10/1991 | Klaila |
| 5,065,819 A | 11/1991 | Kasevich |
| 5,082,054 A | 1/1992 | Kiamanesh |
| 5,136,249 A | 8/1992 | White |
| 5,199,488 A | 4/1993 | Kasevich |
| 5,233,306 A | 8/1993 | Misra |
| 5,236,039 A | 8/1993 | Edelstein |
| 5,251,700 A | 10/1993 | Nelson |
| 5,293,936 A | 3/1994 | Bridges |
| 5,304,767 A | 4/1994 | McGaffigan |
| 5,315,561 A | 5/1994 | Grossi |
| 5,370,477 A | 12/1994 | Bunin |
| 5,378,879 A | 1/1995 | Monovoukas |
| 5,506,592 A | 4/1996 | MacDonald |
| 5,582,854 A | 12/1996 | Nosaka |
| 5,621,844 A | 4/1997 | Bridges |
| 5,631,562 A | 5/1997 | Cram |
| 5,746,909 A | 5/1998 | Calta |
| 5,907,436 A | 5/1999 | Perry |
| 5,910,287 A | 6/1999 | Cassin |
| 5,923,299 A | 7/1999 | Brown et al. |
| 6,045,648 A | 4/2000 | Palmgren et al. |
| 6,046,464 A | 4/2000 | Schetzina |
| 6,055,213 A | 4/2000 | Rubbo |
| 6,063,338 A | 5/2000 | Pham |
| 6,097,262 A | 8/2000 | Combellack |
| 6,097,863 A | 8/2000 | Chowdhury |
| 6,106,895 A | 8/2000 | Usuki |
| 6,112,273 A | 8/2000 | Kau |
| 6,184,427 B1 | 2/2001 | Klepfer |
| 6,192,062 B1 | 2/2001 | Sanchez-Rubio |
| 6,208,679 B1 | 3/2001 | Sanchez-Rubio |
| 6,212,310 B1 | 4/2001 | Waarts |
| 6,229,603 B1 | 5/2001 | Coassin |
| 6,232,114 B1 | 5/2001 | Coassin |
| 6,301,088 B1 | 10/2001 | Nakada |
| 6,303,021 B2 | 10/2001 | Winter |
| 6,330,388 B1 | 12/2001 | Bendett |
| 6,348,679 B1 | 2/2002 | Ryan et al. |
| 6,360,819 B1 | 3/2002 | Vinegar |
| 6,396,975 B1 | 5/2002 | Wood |
| 6,432,365 B1 | 8/2002 | Levin |
| 6,493,476 B2 | 12/2002 | Bendett |
| 6,501,056 B1 | 12/2002 | Hirohata et al. ................ 219/553 |
| 6,533,963 B1 * | 3/2003 | Schleifstein ............. C08K 9/02 252/500 |
| 6,603,309 B2 | 8/2003 | Forgang |
| 6,613,678 B1 | 9/2003 | Sakaguchi |
| 6,614,059 B1 | 9/2003 | Tsujimura |
| 6,636,678 B1 | 10/2003 | Bendett |
| 6,649,888 B2 | 11/2003 | Ryan et al. |
| 6,712,136 B2 | 3/2004 | De Rouffignac |
| 6,808,935 B2 | 10/2004 | Levin |
| 6,813,405 B1 | 11/2004 | Bendett |
| 6,822,796 B2 | 11/2004 | Takada |
| 6,923,273 B2 | 8/2005 | Terry |
| 6,932,155 B2 | 8/2005 | Vinegar |
| 6,958,859 B2 | 10/2005 | Hoose |
| 6,967,589 B1 | 11/2005 | Peters |
| 6,970,494 B1 | 11/2005 | Bendett |
| 6,992,630 B2 | 1/2006 | Parsche |
| 7,046,584 B2 | 5/2006 | Sorrells |
| 7,079,081 B2 | 7/2006 | Parsche et al. |
| 7,091,460 B2 | 8/2006 | Kinzer |
| 7,109,457 B2 | 9/2006 | Kinzer |
| 7,115,847 B2 | 10/2006 | Kinzer ......................... 219/772 |
| 7,147,057 B2 | 12/2006 | Steele |
| 7,172,038 B2 | 2/2007 | Terry |
| 7,203,209 B2 | 4/2007 | Young |
| 7,205,947 B2 | 4/2007 | Parsche |
| 7,312,428 B2 | 12/2007 | Kinzer |
| 7,322,416 B2 | 1/2008 | Burris, II |
| 7,337,980 B2 | 3/2008 | Schaedel |
| 7,403,677 B1 | 7/2008 | Zhao |
| 7,438,807 B2 | 10/2008 | Garner et al. |
| 7,441,597 B2 | 10/2008 | Kasevich |
| 7,461,693 B2 | 12/2008 | Considine et al. |
| 7,484,561 B2 | 2/2009 | Bridges |
| 7,532,656 B2 | 5/2009 | Yang |
| 7,562,708 B2 | 7/2009 | Cogliandro |
| 7,623,804 B2 | 11/2009 | Sone |
| 7,629,497 B2 | 12/2009 | Pringle |
| 7,701,987 B1 | 4/2010 | Savage-Leuchs |
| 8,210,256 B2 | 7/2012 | Bridges |
| 8,729,440 B2 * | 5/2014 | Parsche .................. H05B 6/72 166/177.1 |
| 8,807,220 B2 * | 8/2014 | Madison ................ E21B 43/24 166/272.1 |
| 9,034,176 B2 * | 5/2015 | Parsche .................. C10G 1/00 208/402 |
| 2002/0032534 A1 | 3/2002 | Regier |
| 2004/0031731 A1 | 2/2004 | Honeycutt |
| 2005/0199386 A1 | 9/2005 | Kinzer |
| 2005/0274513 A1 | 12/2005 | Schultz |
| 2006/0038083 A1 | 2/2006 | Criswell |
| 2007/0108202 A1 | 5/2007 | Kinzer |
| 2007/0131591 A1 | 6/2007 | Pringle |
| 2007/0133591 A1 | 6/2007 | Shatford |

(56) References Cited

U.S. PATENT DOCUMENTS

| | | |
|---|---|---|
| 2007/0137852 A1 | 6/2007 | Considine et al. |
| 2007/0137858 A1 | 6/2007 | Considine et al. |
| 2007/0176328 A1 | 8/2007 | Park |
| 2007/0187089 A1 | 8/2007 | Bridges |
| 2007/0261844 A1 | 11/2007 | Cogliandro et al. |
| 2008/0018193 A1 | 1/2008 | Kobayashi |
| 2008/0073079 A1 | 3/2008 | Tranquilla |
| 2008/0143330 A1 | 6/2008 | Madio |
| 2009/0009410 A1 | 1/2009 | Dolgin et al. |
| 2009/0242196 A1 | 10/2009 | Pao |
| 2012/0067580 A1 | 3/2012 | Parsche |

FOREIGN PATENT DOCUMENTS

| | | |
|---|---|---|
| CA | 2678473 | 8/2009 |
| DE | 10 2008 022176 | 11/2009 |
| EP | 0135966 | 4/1985 |
| EP | 0347299 | 12/1989 |
| EP | 0418117 | 3/1991 |
| EP | 0563999 | 10/1993 |
| EP | 1106672 | 6/2001 |
| FR | 1586066 | 2/1970 |
| FR | 2925519 | 6/2009 |
| JP | 56050119 | 5/1981 |
| JP | 2246502 | 10/1990 |
| WO | WO9302849 | 2/1993 |
| WO | 2007/133461 | 11/2007 |
| WO | 2008/011412 | 1/2008 |
| WO | 2008/030337 | 3/2008 |
| WO | 2008/098850 | 8/2008 |
| WO | 2009/027262 | 3/2009 |
| WO | 2009/114934 | 9/2009 |

OTHER PUBLICATIONS

Butler, R. and Mokrys, I., "A New Process (VAPEX) for Recovering Heavy Oils Using Hot Water and Hydrocarbon Vapour", Journal of Canadian Petroleum Technology, 30(1), 1991, pp. 97-106.

Butler, R. and Mokrys, I., "Recovery of Heavy Oils Using Vapourized Hydrocarbon Solvents: Further Development of the VAPEX Process", Journal of Canadian Petroleum Technology, 32(6), 1993, pp. 56-62.

Butler, R. and Mokrys, I., "Closed Loop Extraction Method for the Recovery of Heavy Oils and Bitumens Underlain by Aquifers: the VAPEX Process", Journal of Canadian Petroleum Technology, 37(4), 1998, pp. 41-50.

Das, S.K. and Butler, R.M., "Extraction of Heavy Oil and Bitumen Using Solvents at Reservoir Pressure" CIM 95-118, presented at the CIM 1995 Annual Technical Conference in Calgary, Jun. 1995, pp. 1-16.

Das, S.K. and Butler, R.M., "Diffusion Coefficients of Propane and Butane in Peace River Bitumen" Canadian Journal of Chemical Engineering, 74,988-989, Dec. 1996 pp. 1-8.

Das, S.K. and Butler, R.M., "Mechanism of the Vapour Extraction Process for Heavy Oil and Bitumen", Journal of Petroleum Science and Engineering, 21, 1998, pp. 43-59.

Dunn, S.G., Nenniger, E. and Rajan, R., "A Study of Bitumen Recovery by Gravity Drainage Using Low Temperature Soluble Gas Injection", Canadian Journal of Chemical Engineering, 67, Dec. 1989, pp. 978-991.

Frauenfeld, T., Lillico, D., Jossy, C., Vilcsak, G., Rabeeh, S. and Singh, S., "Evaluation of Partially Miscible Processes for Alberta Heavy Oil Reservoirs", Journal of Canadian Petroleum Technology, 37(4), 1998, pp. 17-24.

Mokrys, I., and Butler, R., "In Situ Upgrading of Heavy Oils and Bitumen by Propane Deasphalting: The VAPEX 11 Process", SPE 25452, presented at the SPE Production Operations Symposium held in Oklahoma City OK USA, D Mar. 21-23, 1993, pp. 1-16.

Nenniger, J.E. and Dunn, S.G., "How Fast is Solvent Based Gravity Drainage?", CIPC 2008-139, presented at the Canadian International Petroleum Conference, held in Calgary, Alberta Canada, Jun. 17-19, 2008, pp. 1-14.

Nenniger, J.E. and Gunnewick, L., "Dew Point vs. Bubble Point: A Misunderstood Constraint on Gravity Drainage Processes", CIPC 2009-065, presented at the Canadian International Petroleum Conference, held in Calgary, Alberta D Canada, Jun. 16-18, 2009, pp. 1-16.

Bridges, J.E., Sresty, G.C., Spencer, H.L. and Wattenbarger, R.A., "Electromagnetic Stimulation of Heavy Oil Wells", 14, Third International Conference on Heavy Oil Crude and Tar Sands, UNITAR/UNDP, Long Beach D California, USA Jul. 22-31, 1985, pp. 1221-1232.

Carrizales, M.A., Lake, L.W. and Johns, R.T., "Production Improvement of Heavy Oil Recovery by Using Electromagnetic Heating", SPE115723, presented at the 2008 SPE Annual Technical Conference and Exhibition held in Denver, Colorado, USA, Sep. 21-24, 2008, p. 1.

Carrizales, M. and Lake, L.W., "Two-Dimensional COMSOL Simulation of Heavy-Oil Recovery by Electromagnetic Heating", Proceedings of the COMSOL Conference Boston, 2009, pp. 1-7.

Chakma, A. and Jha, K.N., "Heavy-Oil Recovery from Thin Pay Zones by Electromagnetic Heating", SPE24817, presented at the 67th Annual Technical Conference and Exhibition of the Society of Petroleum Engineers held in Washington, DC, Oct. 4-7, 1992, pp. 1-10.

Chhetri, A.B. and Islam, M.R., "A Critical Review of Electromagnetic Heating for Enhanced Oil Recovery", Petroleum Science and Technology, 26(14), 2008, pp. 1619-1631.

Chute, F.S., Vermeulen, F.E., Cervenan, M.R. and McVea, F.J., "Electrical Properties of Athabasca Oil Sands", Canadian Journal of Earth Science, 16, 1979, pp. 2009-2021.

Davidson, R.J., "Electromagnetic Stimulation of Lloydminster Heavy Oil Reservoirs", Journal of Canadian Petroleum Technology, 34(4), 1995, pp. 15-24.

Hu, Y., Jha, K.N. and Chakma, A., "Heavy-Oil Recovery from Thin Pay Zones by Electromagnetic Heating", Energy Sources, 21(1-2), 1999, pp. 63-73.

Kasevich, R.S., Price, S.L., Faust, D.L. and Fontaine, M.F., "Pilot Testing of a Radio Frequency Heating System for Enhanced Oil Recovery from Diatomaceous Earth", SPE28619, presented at the SPE 69th Annual Technical Conference and Exhibition held in New Orleans LA, USA, Sep. 25-28, 1994, pp. 1-15.

Koolman, M., Huber, N., Diehl, D. and Wacker, B., "Electromagnetic Heating Method to Improve Steam Assisted /N.B./ 23 Gravity Drainage", SPE117481, presented at the 2008 SPE International Thermal Operations and Heavy Oil Symposium held in Calgary, Alberta, Canada, Oct. 20-23, 2008, pp. 1-13.

Kovaleva, L.A., Nasyrov, N.M. and Khaidar, A.M., Mathematical Modelling of High-Frequency Electromagnetic Heating of the Bottom-Hole Area of Horizontal Oil Wells, Journal of Engineering Physics and Thermo Physics, 77(6), 2004, pp. 1184-1191.

McGee, B.C.W. and Donaldson, RD., "Heat Transfer Fundamentals for Electro-thermal Heating of Oil Reservoirs", CIPC 2009-024, presented at the Canadian International Petroleum Conference, held in Calgary, Alberta, Canada, Jun. 16-18, 2009, pp. 1-16.

Ovalles, C., Fonseca, A., Lara, A., Alvarado, V., Urrecheaga, K., Ranson, A. and Mendoza, H., "Opportunities of Downhole Dielectric Heating in Venezuela: Three Case Studies Involving Medium, Heavy and Extra-Heavy Crude Oil D Reservoirs" SPE78980, presented at the 2002 SPE International Thermal Operations and Heavy Oil Symposium and International Horizontal Well Technology Conference held in Calgary, Alberta, Canada, Nov. 4-7, 2002, pp. 1-10.

Rice, S.A., Kok, A.L. and Neate, C.J., "A Test of the Electric Heating Process as a Means of Stimulating the 27 Productivity of an Oil Well in the Schoonebeek Field", CIM 92-04 presented at the CIM 1992 Annual Technical Conference in Calgary, Jun. 7-10, 1992, pp. 1-16.

Sahni, A. and Kumar, M. "Electromagnetic Heating Methods for Heavy Oil Reservoirs", SPE62550, presented at the 2000 SPE/AAPG Western Regional Meeting held in Long Beach, California, Jun. 19-23, 2000, pp. 1-10.

Sayakhov, F.L., Kovaleva, L.A. and Nasyrov, N.M., "Special Features of Heat and Mass Exchange in the Face Zone of /N.B./ 29 Boreholes upon Injection of a Solvent with a Simultaneous Electromagnetic Effect", Journal of Engineering Physics and Thermophysics, 71(1), 1998, pp. 161-165.

(56) References Cited

OTHER PUBLICATIONS

Spencer, H.L., Bennett, K.A. and Bridges, J.E. "Application of the IITRI/Uentech Electromagnetic Stimulation Process iN.B.i 30 to Canadian Heavy Oil Reservoirs" Paper 42, Fourth International Conference on Heavy Oil Crude and Tar Sands, UNITARIUNDP, Edmonton, Alberta, Canada, Aug. 7-12, 1988, pp. 1-8.
Sresty, G.C., Dev, H., Snow, R.H. and Bridges, J.E., "Recovery of Bitumen from Tar Sand Deposits with the Radio Frequency Process", SPE Reservoir Engineering, Jan. 1986, pp. 85-94.
Vermulen, F. and McGee, B.C.W., "In Situ Electromagnetic Heating for Hydrocarbon Recovery and Environmental Remediation", Journal of Canadian Petroleum Technology, Distinguished Author Series, 39(8), 2000, pp. 25-29.
Schelkunoff, S.K. and Friis, H.T., "Antennas: Theory and Practice", John Wiley & Sons, Inc., London, Chapman Hall, Limited, 1952, pp. 229-244, 351-353.
Gupta, S.C., Gittins, S.D., "Effect of Solvent Sequencing and Other Enhancement on Solvent Aided Process", Journal of Canadian Petroleum Technology, vol. 46, No. 9, Sep. 2007, pp. 57-61.
Deutsch, C.V., McLennan, J.A., "The Steam Assisted Gravity Drainage (SAGD) Process," Guide to SAGD (Steam Assisted Gravity Drainage) Reservoir Characterization Using Geostatistics, Centre for Computational Statistics (CCG), Guidebook Series, 2005, vol. 3; p. 2, section 1.2, published by Centre for Computational Statistics, Edmonton, AB, Canada, pp. 1-14.
Marcuvitz, Nathan, Waveguide Handbook; 1986; Institution of Engineering and Technology, vol. 21 of IEE Electromagnetic Wave series, ISBN 0863410588, Chapter 1, pp. 1-54, published by Peter Peregrinus Ltd. on behalf of The Institution of Electrical Engineers, © 1986, pp. 1-57.
Marcuvitz, Nathan, Waveguide Handbook; 1986; Institution of Engineering and Technology, vol. 21 of IEE Electromagnetic Wave series, ISBN 0863410588, Chapter 2.3, pp. 66-72, published by Peter Peregrinus Ltd. on behalf of The Institution of Electrical Engineers, © 1986. pp. 1-10.
Carlson et al., "Development of the IIT Research Institute RF Heating Process for In Situ Oil Shale/Tar Sand Fuel Extraction—An Overview", Apr. 1981, pp. 1-9.
A. Godio: "Open ended-coaxial Cable Measurements of Saturated Sandy Soils", American Journal of Environmental Sciences, vol. 3, No. 3, 2007, XP002583544, pp. 175-182.
"Control of Hazardous Air Pollutants From Mobile Sources", U.S. Environmental Protection Agency, Mar. 29, 2006. p. 15853 (http://www.epa.gov/EPA-AIR/2006/March/Day-29/a2315b.htm), pp. 1-13.
Von Hippel, Arthur R., Dielectrics and Waves, Copyright 1954, Library of Congress Catalog Card No. 54-11020, Contents, pp. xi-xii; Chapter II, Section 17, "Polyatomic Molecules", Appendix C-E, New York, John Wiley and Sons, pp. 150-155, pp. 273-277.
"Technologies for Enhanced Energy Recovery" Executive Summary, Radio Frequency Dielectric Heating Technologies for Conventional and Non-Conventional Hydrocarbon-Bearing Formulations, Quasar Energy, LLC, Sep. 3, 2009, pp. 1-6.
Burnhan, "Slow Radio-Frequency Processing of Large Oil Shale Volumes to Produce Petroleum-like Shale Oil," U.S. Department of Energy, Lawrence Livermore National Laboratory, Aug. 20, 2003, UCRL-ID-155045, pp. 1-17.
Sahni et al., "Electromagnetic Heating Methods for Heavy Oil Reservoirs," U.S. Department of Energy, Lawrence Livermore National Laboratory, May 1, 2000, UCL-JC-138802, pp. 1-10.
Abernethy, "Production Increase of Heavy Oils by Electromagnetic Heating," The Journal of Canadian Petroleum Technology, Jul.-Sep. 1976, pp. 91-97.
Sweeney, et al., "Study of Dielectric Properties of Dry and Saturated Green River Oil Shale," Lawrence Livermore National Laboratory, Mar. 26, 2007, revised manuscript Jun. 29, 2007, published on Web Aug. 25, 2007, pp. 1-9.
Kinzer, "Past, Present, and Pending Intellectual Property for Electromagnetic Heating of Oil Shale," Quasar Energy LLC, 28th Oil Shale Symposium Colorado School of Mines, Oct. 13-15, 2008, pp. 1-18.
Kinzer, "Past, Present, and Pending Intellectual Property for Electromagnetic Heating of Oil Shale," Quasar Energy LLC, 28th Oil Shale Symposium Colorado School of Mines, Oct. 13-15, 2008, pp. 1-33.
Kinzer, A Review of Notable Intellectual Property for In Situ Electromagnetic Heating of Oil Shale, Quasar Energy LLC, p. 1.
"Oil sands." Wikipedia, the free encyclopedia. Retrieved from the Internet from: http://en.wikipedia.org/w/index.php? title=Oil_sands &printable=yes, Feb. 16, 2009, pp. 1-14.
Sahni et al., "Electromagnetic Heating Methods for Heavy Oil Reservoirs." 2000 Society of Petroleum Engineers SPE/AAPG Western Regional Meeting, Jun. 19-23, 2000, pp. 1-12.
Power et al., "Froth Treatment: Past, Present & Future." Oil Sands Symposium, University of Alberta, May 3-5, 2004, pp. 1-29.
Flint, "Bitumen Recovery Technology A Review of Long Term R&D Opportunities." Jan. 31, 2005. LENEF Consulting (1994) Limited, Part 1, 100 pgs; Part 2, 110 pgs.
"Froth Flotation." Wikipedia, the free encyclopedia. Retrieved from the internet from: http://en.wikipedia.org/wiki/ Froth_flotation, Apr. 7, 2009, pp. 1-6.
"Relative static permittivity." Wikipedia, the free encyclopedia. Retrieved from the Internet from http://en.wikipedia.org/ w/index/ php?title=Relative_static_permittivity&printable=yes, Feb. 12, 2009, pp. 1-3.
"Tailings." Wikipedia, the free encyclopedia. Retrieved from the Internet from http://en.wikipedia.org/w/index.php? title=Tailings &printable=yes, Feb. 12, 2009, pp. 1-6.
Heart et al., "Measured physical characteristics of the West Ford belt Authors", Proceedings of the IEEE, vol. 52, issue 5, May 1964, pp. 519-533.
United States Patent and Trademark Office, Non-final Office action issued in U.S. Appl. No. 12/396,247, dated Mar. 28, 2011, pp. 1-10.
United States Patent and Trademark Office, Non-final Office action issued in U.S. Appl. No. 12/396,284, dated Apr. 26, 2011, pp. 1-62.
Patent Cooperation Treaty, Notification of Transmittal of the International Search Report and The Written Opinion of the International Searching Authority, or the Declaration, in PCT/US201 0/025808, dated Apr. 5, 2011, pp. 1-12.
PCT International Search Report and Written Opinion in PCT/US2010/025765, Jun. 30, 2010, pp. 1-11.
PCT International Search Report and Written Opinion in PCT/US2010/025772, Aug. 9, 2010, pp. 1-16.
PCT International Search Report and Written Opinion in PCT/US2010/025763, Jun. 4, 2010, pp. 1-15.
PCT International Search Report and Written Opinion in PCT/US2010/025807, Jun. 17, 2010, pp. 1-15.
PCT International Search Report and Written Opinion in PCT/US2010/025804, Jun. 30, 2010, pp. 1-15.
PCT International Search Report and Written Opinion in PCT/US2010/025769, Jun. 10, 2010, pp. 1-15.
PCT Notification of Transmittal of the International Search Report and The Written Opinion of the International Searching Authority, or the Declaration, in PCT/US2010/025761, dated Feb. 9, 2011, pp. 1-13.
PCT Notification of Transmittal of the International Search Report and The Written Opinion of the International Searching Authority, or the Declaration, in PCT/US2010/057090, dated Mar. 3, 2011, pp. 1-10.
H.S. Han et al.: 'Coefficient determination related to optical gain in erbium-doped silicon-rich silicon oxide waveguide amplifier' Appl. Phys. Lett. vol. 81, Nov. 11, 2002, p. 3720.
P.G. Kik, A. Polman: 'Exciton-erbium energy transfer in Si nanocrystal-doped Si02' Materials Science and Engineering vol. B81, 2001, pp. 3-8.
P.G. Kik, A. Polman: 'Exciton-erbium energy transfer in Si nanocrystal-doped Si02' J. Appl. Phys. vol. 88, No. 4, Aug. 15, 2000, pp. 1992-1998.

\* cited by examiner

CARBON STRAND RADIO FREQUENCY HEATING SUSCEPTOR

CROSS REFERENCE TO RELATED APPLICATIONS

This application is a divisional of pending Ser. No. 13/414,096 filed Mar. 7, 2012, which, in turn, is a divisional of Ser. No. 12/396,021 filed Mar. 2, 2009 now U.S. Pat. No. 8,133,384 issued Mar. 13, 2012, and is related to U.S. patent application Ser. Nos. 12/396,247, 12/395,995, 12/395,945, 12/396,192, 12/396,284, 12/396,057, 12/395,953, and 12/395,918 filed on Mar. 2, 2009, each of which is incorporated by reference herein.

STATEMENT REGARDING FEDERALLY SPONSORED RESEARCH OR DEVELOPMENT

Not Applicable

BACKGROUND OF THE INVENTION

The disclosure concerns a method and apparatus for heating materials by application of radio frequency ("RF") energy, also known as electromagnetic energy. In particular, the disclosure concerns an advantageous method for RF heating of materials with a low or zero electric dissipation factor, magnetic dissipation factor, and electrical conductivity, such as petroleum ore. For example, the disclosure enables efficient, low-cost heating of bituminous ore, oil sands, oil shale, tar sands, or heavy oil.

Bituminous ore, oil sands, tar sands, and heavy oil are typically found as naturally occurring mixtures of sand or clay and dense and viscous petroleum. Recently, due to depletion of the world's oil reserves, higher oil prices, and increases in demand, efforts have been made to extract and refine these types of petroleum ore as an alternative petroleum source. Because of the extremely high viscosity of bituminous ore, oil sands, oil shale, tar sands, and heavy oil, however, the drilling and refinement methods used in extracting standard crude oil are typically not available. Therefore, bituminous ore, oil sands, oil shale, tar sands, and heavy oil are typically extracted by strip mining, or in situ techniques are used to reduce the viscosity by injecting steam or solvents in a well so that the material can be pumped. Under either approach, however, the material extracted from these deposits can be a viscous, solid or semisolid form that does not easily flow at normal oil pipeline temperatures, making it difficult to transport to market and expensive to process into gasoline, diesel fuel, and other products. Typically, the material is prepared for transport by adding hot water and caustic soda (NaOH) to the sand, which produces a slurry that can be piped to the extraction plant, where it is agitated and crude bitumen oil froth is skimmed from the top. In addition, the material is typically processed with heat to separate oil sands, oil shale, tar sands, or heavy oil into more viscous bitumen crude oil, and to distill, crack, or refine the bitumen crude oil into usable petroleum products.

The conventional methods of heating bituminous ore, oil sands, tar sands, and heavy oil suffer from numerous drawbacks. For example, the conventional methods typically utilize large amounts of water, and also large amounts of energy. Moreover, using conventional methods, it has been difficult to achieve uniform and rapid heating, which has limited successful processing of bituminous ore, oil sands, oil shale, tar sands, and heavy oil. It can be desirable, both for environmental reasons and efficiency/cost reasons to reduce or eliminate the amount of water used in processing bituminous ore, oil sands, oil shale, tar sands, and heavy oil, and also provide a method of heating that is efficient and environmentally friendly, which is suitable for post-excavation processing of the bitumen, oil sands, oil shale, tar sands, and heavy oil.

One potential alternative heating method is RF heating. "RF" is most broadly defined here to include any portion of the electromagnetic spectrum having a longer wavelength than visible light. Wikipedia provides a definition of "radio frequency" as comprehending the range of from 3 Hz to 300 GHz, and defines the following sub ranges of frequencies:

| Name | Symbol | Frequency | Wavelength |
|---|---|---|---|
| Extremely low frequency | ELF | 3-30 Hz | 10,000-100,000 km |
| Super low frequency | SLF | 30-300 Hz | 1,000-10,000 km |
| Ultra low frequency | ULF | 300-3000 Hz | 100-1,000 km |
| Very low frequency | VLF | 3-30 kHz | 10-100 km |
| Low frequency | LF | 30-300 kHz | 1-10 km |
| Medium frequency | MF | 300-3000 kHz | 100-1000 m |
| High frequency | HF | 3-30 MHz | 10-100 m |
| Very high frequency | VHF | 30-300 MHz | 1-10 m |
| Ultra high frequency | UHF | 300-3000 MHz | 10-100 cm |
| Super high frequency | SHF | 3-30 GHz | 1-10 cm |
| Extremely high frequency | EHF | 30-300 GHz | 1-10 mm |

"RF heating," then, is most broadly defined here as the heating of a material, substance, or mixture by exposure to RF energy. For example, microwave ovens are a well-known example of RF heating. RF heating can have advantages of high speed, deep or adjustable heating depth, or even selective heating where one component of a mixture receives more heat than another. For instance, RF energy may penetrate wood fibers to cure internal adhesives without scorching. In some petroleum processes boiling water is added to relatively cold petroleum ores and the temperature of the resulting mixture/slurry may be insufficient. As it can be expensive to raise the temperature of water above the boiling point at atmospheric pressure RF heating techniques can increase slurry heat without steam or pressure vessels.

The nature and suitability of RF heating depends on several factors. In general, most materials accept electromagnetic waves, but the degree to which RF heating occurs varies widely. RF heating is dependent on the frequency of the electromagnetic energy, intensity of the electromagnetic energy, proximity to the source of the electromagnetic energy, and type of RF energy fields. RF heating material properties include conductivity of the material to be heated, whether the material to be heated is magnetic or non-magnetic, and the dielectric polarizability. Pure hydrocarbon molecules are substantially nonconductive, of low dielectric loss factor and nearly zero magnetic moment. Thus, pure hydrocarbon molecules themselves are only fair susceptors for RF heating, e.g. they may heat only slowly in the presence of RF fields. For example, the dissipation factor D of aviation gasoline may be 0.0001 and distilled water 0.157 at 3 GHz, such that RF fields apply heat 1570 times faster to the water in emulsion to oil.

Similarly, a water/hydrocarbon mixture may not achieve desirable RF heating. Water, even distilled water, can be a susceptor for RF heating. However, the use of water in RF heating is limited to 212° F. (100° C.) at atmospheric pressures, as the vapor phase of water (steam) is a poor RF susceptor. Moreover, in some regions, water resources may be insufficient, and it may be limiting or even impractical to process petroleum ores with hot water or steam.

SUMMARY OF THE INVENTION

An aspect of the present invention is a method and apparatus for RF heating of materials with a low or zero electric dissipation factor, magnetic dissipation factor, and electrical conductivity. For example, the present invention may be used for RF heating of petroleum ore, such as bituminous ore, oil sands, tar sands, oil shale, or heavy oil. The present invention is especially suited for RF heating of petroleum ore above 100° C., where liquid water cannot exist at ordinary atmospheric pressure. An exemplary embodiment of the present method comprises first mixing about 10% to about 99% by volume of a substance such as petroleum ore with about 1% to about 50% by volume of a substance comprising mini-dipole susceptors. The mixture is then subjected to a radio frequency in a manner which creates heating of the mini-dipole susceptors. The radio frequency can be applied for a sufficient time to allow the mini-dipole susceptors to heat the surrounding substance through conduction, so that the average temperature of the mixture can be greater than about 212° F. (100° C.). After the mixture has achieved the desired temperature, the radio frequency can be discontinued, and substantially all of the mini-dipole susceptors can optionally be removed, resulting in a heated substance that can be substantially free of the mini-dipole susceptors used in the RF heating process.

Other aspects of the invention will be apparent from this disclosure.

DETAILED DESCRIPTION OF THE PREFERRED EMBODIMENTS

Figure 1:
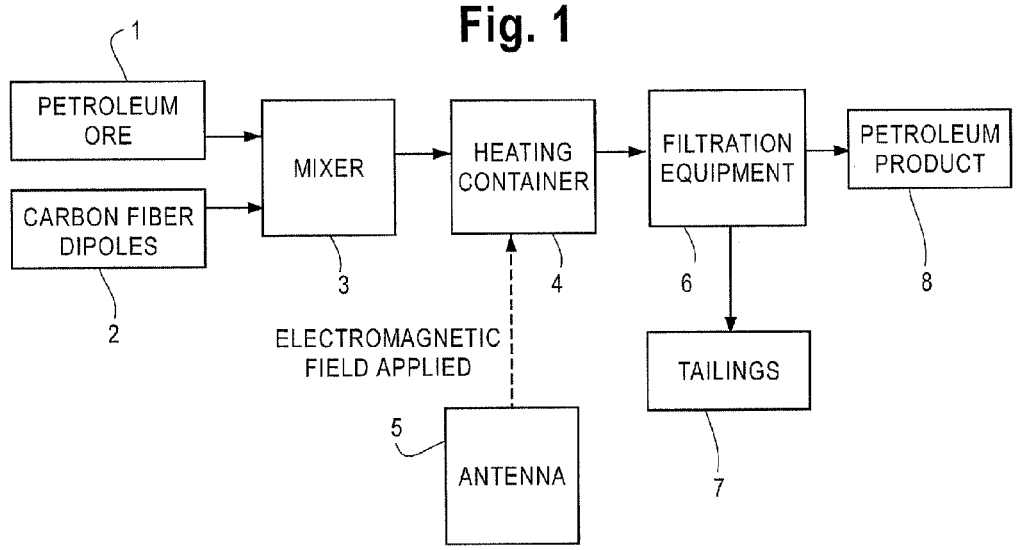
FIG. 1 is a flow diagram depicting a process and equipment for RF heating of a petroleum ore using mini-dipole susceptors.

The subject matter of this disclosure will now be described more fully, and one or more embodiments of the invention are shown. This invention may, however, be embodied in many different forms and should not be construed as limited to the embodiments set forth herein. Rather, these embodiments are examples of the invention, which has the full scope indicated by the language of the claims.

In an exemplary method, a method for heating a petroleum ore such as bituminous ore, oil sands, tar sands, oil shale, or heavy oil using RF energy is provided.

Petroleum Ore

The presently disclosed method can be utilized to either heat a petroleum ore that has been extracted from the earth, prior to distillation, cracking, or separation processing, or can be used as part of a distillation, cracking, or separation process. The petroleum ore can comprise, for example, bituminous ore, oil sands, tar sands, oil shale, or heavy oil that has been extracted via strip-mining or drilling. If the extracted petroleum ore is a solid or includes solids with a volume greater than about 1 cubic centimeter, the petroleum ore can be crushed, ground, or milled to a slurry, powder, or small-particulate state prior to RF heating. The petroleum ore can comprise water, but alternatively contains less than 10%, less than 5%, or less than 1% by volume of water. Most preferably, the petroleum ore can be substantially free of added water, as the present invention provides a means of RF heating without the presence of any water. This disclosure is especially suitable for RF heating of hydrocarbons without water emulsion, and for RF heating above 100° C. where liquid water may not be available as an emulsified susceptor without a pressure vessel.

The petroleum ore used in the present method is typically non-magnetic or low-magnetic, and non-conductive or low-conductive. Therefore, the petroleum ore alone is not generally suitable for rapid RF heating. For example, exemplary petroleum ore when dry, e.g. free from water, may have a dielectric dissipation factor ($\epsilon''$) less than about 0.01, 0.001, or 0.0001 at 3000 MHz. Exemplary petroleum ore may also have a negligible magnetic dissipation factor ($\mu''$), and the exemplary petroleum ore may also have an electrical conductivity of less than 0.01, 0.001, or 0.0001 S·m$^{-1}$ at 20° C. The presently disclosed methods, however, are not limited to petroleum products with any specific magnetic or conductive properties, and can be useful to RF heat substances with a higher dielectric dissipation factors ($\epsilon''$), magnetic dissipation factor ($\mu''$), or electrical conductivity. The presently disclosed methods are also not limited to petroleum ore, but are widely applicable to RF heating of any substance that has dielectric dissipation factor ($\epsilon''$) less than about 0.05, 0.01, or 0.001 at 3000 MHz. It is also applicable to RF heating of any substance that has an electrical conductivity of less than 0.01 S·m$^{-1}$, 1×10$^{-4}$ S·m$^{-1}$, or 1×10$^{-6}$ S·m$^{-1}$ at 20° C.

Susceptor Mini-Dipoles

The presently disclosed method utilizes a mini-dipole antenna susceptor structure in conjunction with the petroleum ore to provide improved RF heating. A "susceptor" is herein defined as any material which absorbs electromagnetic energy and transforms it to heat. A "mini-dipole" susceptor is herein defined as any susceptor that reacts as a dipole antenna to RF energy, and which has a longest dimension less than 10 cm, 5 cm, 1 cm, or 0.5 cm.

Susceptors have been suggested for applications such as microwave food packing, thin-films, thermosetting adhesives, RF-absorbing polymers, and heat-shrinkable tubing. Examples of susceptor materials are disclosed in U.S. Pat. Nos. 5,378,879; 6,649,888; 6,045,648; 6,348,679; and 4,892,782, which are incorporated by reference herein.

In the presently disclosed method, thin filament-like conductive structures, such as fine metal wires or carbon fibers can be distributed through the hydrocarbon ore as susceptors. The filaments form mini-dipole antennas to capture the incident RF energy/electromagnetic fields and to dissipate them as heat. The method of heating can be resistive by the motion of electrons or charge carriers through the resistance of the dipole structure, e.g. electric current I and heating according to Joule's First law or $Q = I^2 R t$.

In general, antennas can comprise conductive structures used to transduce electric currents in electromagnetic waves and vice versa. The canonical antennas are the line and circle, corresponding to the dipole and the loop types, and the curl and divergence of electric current. The field regions of the simplest antennas include reactive near field, middle field, and radiated far field regions. The field types surrounding antennas include both electric (E) fields and magnetic (H) fields. When in conductive media electric currents may exist about the antenna, e.g. antennas may have aspects of being electrodes as well. An RF applicator may be interchangeably referred to as a dipole antenna (such as a skeleton slot antenna) or an electrode pair.

A half wave dipole antenna comprises a thin line-like conductor near one half wavelength in length ($l = \lambda/2$). The effective aperture or capture area of a loaded resistively matched small dipole antenna can be $A_{em} = 3\lambda^2/16\pi = 0.06\lambda^2$, and if the dipole antenna comprises a thin conductor the effective width may about 1000 times larger than the physical width. Thus, a single thin wire dipole antenna can transduce RF energy from a very large surrounding area relative its physical area. For example, thin metallic foil strips have been sown as radar chaff and the reflection area was much greater than the physical area of the small dipoles. An example of dipole aperture area was the orbiting dipole belt realized about the earth in Project West Ford ("Measured Physical Characteristics Of The West Ford Belt", Heart F. E. et. al., Proceedings of the IEEE, Vol. 52, Issue 5, May 1964 pages 519-533). In project West Ford, a sparsely sown dipole cloud (dipole wires 0.0018 cm diameter, e.g. AWG 53, and 1.78 cm length) about the earth was useful for the passive relay of communications (~8 GHz) between ground stations. The dipole formation was akin perhaps to forming rings around the earth, similar to the rings of Saturn, yet the dipole formation was optically transparent. Even a small number of thin dipoles can have great effect in RF applications.

Here, mini-dipole filaments may be provided at a resonant length, such as ½ wavelength. In other instances the mini-dipole may be electrically small and below resonance to increase the depth of penetration of RF fields. For example, the mini-dipole may be ¼ wavelength, ⅛ wavelength, or 1/16 wavelength. For ½ wave resonant operation, the resistance of the conductive fibers may preferentially be about 73 Ohms to provide a resistive load for the dipole they form, e.g. the radiation resistance $R_r$ is about equal to the dipole conductor loss resistance $R_l$. Alternatively, the resistance of the conductive fibers may from 50 to 73 Ohms, or from 73 Ohms to 100 Ohms.

RF energy may be applied at a single frequency or a range or frequencies for different heating effects. For instance, deep heating may simultaneously occur with increased surface heating by application of a low and high RF frequency simultaneously. The surface heating may provide a surface hardening, drying effect, appearance change or otherwise. The mini-dipole susceptors 210 have enhanced susception, e.g. increased RF heating, at harmonic frequency intervals, especially odd harmonics (for example, F, 3F, and 5F), where F is the fundamental resonance frequency). Increased thermal gradient with increased frequency occurs with mini-dipole susceptors. The 3 dB (50 percent heating change) bandwidth of thin ½ wave dipoles of approximately fundamental resonance can be about 13 percent for small diameters, e.g. $d<\lambda/50$.

Mini-dipole RF heating can be performed, for example, using carbon fiber, carbon fiber floc, or carbon fiber cloth (e.g., carbon fiber squares) susceptors. Carbon fibers or carbon fiber floc may be less than 5 cm long and less than 0.5 mm in diameter. Preferably, carbon fibers or carbon fiber floc are less than 1 cm long or less than 0.1 mm in diameter. Carbon fiber cloth dipoles or carbon fiber squares can be for example less than 5 cm by 5 cm by 0.5 mm, alternatively less than 1 cm by 1 cm by 0.5 mm. The mini dipole susceptor fibers do not need to be straight and it can be unimportant whether they are in contact with on another.

Suitable carbon fibers, such as the present generation of graphite structural fibers, preferably provide circuit resistance, e.g conductor loss. Graphite fibers are also low in cost and may be relatively chemically inert. The fibers may be about 0.02 mm, 0.010 mm, 0.005 mm, or 0.001 mm in diameter and may comprise carbon atoms bonded together in microscopic crystals that are approximately aligned parallel to the long axis of the fiber. A commercial example graphite fiber is HexTow 1900/IM Chopped Carbon Fiber by Hexcell Corporation of Stamford Conn. The product is vended as rectangular flakes that break apart releasing the individual fibers during processing, forming a method for the release of the carbon fiber dipoles into the hydrocarbon ore.

Suitable carbon fiber square susceptors may be related to both the dipole and the loop form of antennas. When the circumference of the square approaches ½ wavelength in the media the resistive square approximates the panel form of the loop antenna and electrical current is transduced to flow circumferentially around the perimeter of the square, e.g. electromagnetic curl. While not isotropic, the radiation pattern of a ½ wavelength perimeter square loop antenna may have shallow pattern nulls, and the square of course has a larger physical surface area than the thin filamentary dipole and may be preferential for higher rates of heat application.

Mixing of Petroleum Ore and Susceptor Dipoles

Preferably, a mixing or dispersion step is provided, whereby a composition comprising the susceptor dipoles is mixed or dispersed in the petroleum ore. The mixing step can occur after the petroleum ore has been crushed, ground, or milled, or in conjunction with the crushing, grinding, or milling of the petroleum ore. The mixing step can be conducted using any suitable method or apparatus that disperses the susceptor dipoles in a substantially uniform manner. For example, a sand mill, cement mixer, continuous soil mixer, or similar equipment can be used. The susceptor dipoles may also be mixed or further mixed during transport in a pipeline.

An advantageous capability of the presently disclosed methods can be the fact that large amounts of susceptors can optionally be used without negatively affecting the chemical or material properties of the processed petroleum ore, because the susceptor particles may be removed. Therefore, a composition comprising susceptors can for example be mixed with the petroleum ore in amount from about 1% to about 50% by volume of the total mixture. Alternatively, the composition comprising susceptors comprises from about 1% to about 25% by volume of the total mixture, or about 1% to about 10% by volume of the total mixture.

The susceptors can be distributed uniformly in the material to be heated, as when uniform heating is contemplated. Alternatively, the susceptors can be non-uniformly distributed if non-uniform heating is contemplated. The electromagnetic capture area of a ½ wavelength resistive dipole antenna in, for example, air at 2450 MHz is $0.119\lambda^2/2=1.4$ square inches (3.6 square cm), which would correspond to a length of the dipole of 2.4 inches (6.1 cm). The application rate (density of the susceptors) for this example may be about 1 susceptor per cubic inch of material to be heated (or 0.5 per cubic cm). In other materials, and for resonance, the susceptor dipole length may be $l=(\lambda/2)(1/\sqrt{\mu_r \epsilon_r})$. Depending on the material or frequency, average susceptor density may be from 0.1 susceptor per cubic cm to about 10 susceptors per cubic cm, or 1 susceptor per cubic cm to about 5 susceptors per cubic cm. When the susceptors are closer than about $\lambda/2\pi$, however, significant near field coupling occurs between dipoles and additional susceptor density may not be further beneficial.

The exemplary mini-dipole susceptors are distinguishable from merely using carbon as a susceptor material, because the RF heating is not generated primarily by dielectric heating or magnetic moment heating due the atomic or molecular properties of the carbon, but rather, is generated due to the electrically conductive nature of the carbon fiber, carbon fiber floc, or cloth and its shape as an antenna structure, e.g. a dipole or dipole antenna array is formed in situ the media to be heated.

Radio Frequency Heating

After the susceptor particle composition has been mixed in the petroleum ore, the mixture can be heated using RF energy. An RF source can be provided which applies RF energy to cause the susceptors to generate heat. The resistive heat generated inside the susceptors causes the overall mixture to heat by conduction. The preferred RF frequency, power, and source proximity vary in different embodiments depending on the properties of the petroleum ore, the susceptor particle selected, and the desired mode of RF heating.

In one exemplary embodiment, RF energy can be applied in a manner that causes the susceptors to heat by near fields, e.g. induction. Induction heating involves applying a near field RF field to electrically conducting materials to create current flow thereon. An eddy current is created when an electrically conducting material is exposed to a changing magnetic field due to relative motion of the field source and conductor; or due to variations of the field with time. This can cause a circulating flow or current of electrons within the conductor. These circulating eddies of current create electromagnets with magnetic fields that opposes the change of the magnetic field according to Lenz's law. These eddy currents generate heat. The degree of heat generated in turn, depends on the strength of the RF field, the electrical conductivity of the heated material, and the change rate of the RF field. There can be also a relationship between the frequency of the RF field and the depth to which it penetrate the material; in general, higher RF frequencies generate a higher heat rate.

The RF source used for induction RF heating can be for example a loop antenna or magnetic near-field applicator suitable for generation of a magnetic field. The RF source typically comprises an electromagnet through which a high-frequency alternating current (AC) is passed. For example, the RF source can comprise an induction heating coil, a chamber or container containing a loop antenna, or a magnetic near-field applicator. The exemplary RF frequency for induction RF heating can be from about 50 Hz to about 3 GHz. Alternatively, the RF frequency can be from about 10 kHz to about 10 MHz, 10 MHz to about 100 MHZ, or 100 MHz to about 2.5 GHz. The power of the RF energy, as radiated from the RF source, can be for example from about 100 KW to about 2.5 MW, alternatively from about 500 KW to about 1 MW, and alternatively, about 1 MW to about 2.5 MW. It can be preferable to properly thermally load the mini-dipole susceptors, as even a single fine strand can transduce large amounts of energy.

In yet another embodiment, the RF energy source used can be far-field RF energy, and the susceptors selected act as mini-dipole antennas that generate heat. One property of a dipole antenna is that it can convert RF waves to electrical current. The material of the dipole antenna, therefore, can be selected such that it resistively heats under an electrical current. A far-field RF energy, e.g. a radio wave, rather than a near-field or induction field, can be applied to the mixture to be heated. The RF frequency used can be for example the resonant frequency of the carbon-fiber dipoles. Heating penetration can also be adjusted by varying the dipole size or the frequency away from resonance. The power of the RF energy radiated from the applicator can be adjusted over a wide range as the dipole susceptor is a passive linear device. RF heat application rates may be for example 100 watts per cubic foot of to about 10 KW per cubic foot. As background, the paper "The RF Characteristics Of Thin Dipoles, C. L. Mack and B. Reiffen, Proceedings of the Institute of Electrical and Electronics Engineers (IEEE), Volume 52, Issue 5, May 1964, pp 533-542 is incorporated herein as a reference in its entirety.

In each of the presently exemplary embodiments, RF energy can be applied for a sufficient time to allow the heated susceptor mini-dipoles to heat the surrounding hydrocarbon oil, ore, or sand. For example, RF energy can be applied for sufficient time so that the average temperature of the mixture can be greater than about 150° F. (70° C.). Alternatively, RF energy can be applied until the average temperature of the mixture is above that of boiling water for example, greater than 212° F. (100° C.), or greater than 200° F. (90° C.), 300° F. (150° C.), or 400° F. (200° C.). Alternatively, RF energy can be applied until the average temperature of the mixture is, for example, sufficient for distillation or pyrolysis according to the molecular weight of the hydrocarbon. Temperatures in excess of 1000° F. (540° C.) are possible depending on the dipole fiber material, e.g. temperatures above those typical or needed for hydrocarbon processing may be achieved. In a variation on the exemplary embodiment, the RF energy can be applied as part of a distillation or cracking process, whereby the mixture can be heated above the pyrolysis temperature of the hydrocarbon in order to break complex molecules such as kerogens or heavy hydrocarbons into simpler molecules (e.g. light hydrocarbons). It is presently believed that the suitable length of time for application of RF energy in the presently disclosed embodiments can be preferably from about 15 seconds, 30 seconds, or 1 minute to about 10 minutes, 30 minutes, or 1 hour. After the hydrocarbon/susceptor mixture has achieved the desired average temperature, exposure of the mixture to the radio frequency can be discontinued. For example, the RF source can be turned off or halted, or the mixture can be removed from the RF source.

Removal/Reuse of Susceptors

In certain embodiments, the present disclosure also contemplates the ability to remove the susceptors after the hydrocarbon/susceptor mixture has achieved the desired average temperature.

If the susceptors are left in the mixture, in certain embodiments this may undesirably alter the chemical and material properties of the primary substance. For example, it can be undesirable for a composition to contain significant amounts of metal or metal oxide powders, polymer dipoles, or fibers. One alternative is to use a low volume fraction of susceptor, if any. For example, U.S. Pat. No. 5,378,879 describes the use of permanent susceptors in finished articles, such as heat-shrinkable tubing, thermosetting adhesives, and gels, and states that articles loaded with particle percentages above 15% are generally not preferred, and in fact, are achievable in the context of that patent only by using susceptors having relatively lower aspect ratios. The present disclosure provides the alternative of removing the susceptors after RF heating. By providing the option of removing the susceptors after RF heating, the present disclosure can reduce or eliminate undesirable altering of the chemical or material properties of the petroleum ore, while allowing a large volume fraction of susceptors to be used. The susceptor particle composition can thus function as a temporary heating substance, as opposed to a permanent additive.

Removal of the susceptor particle composition can vary depending on the type of susceptors used and the consistency, viscosity, or average particle size of the mixture. If necessary or desirable, removal of the susceptors can be performed in conjunction with an additional mixing step. If a magnetic or conductive susceptor is used, substantially all of the susceptors can be removed with one or more magnets, such as quiescent or direct-current magnets. Carbon fiber, carbon floc, or carbon fiber cloth susceptors can be removed through flotation, centrifuging, or filtering. For example, removal of the susceptors can be performed either while the petroleum ore/susceptor mixture is still being RF heated, or within a sufficient time after RF heating has been stopped so that the temperature of the petroleum ore decreases by no more than 30%, and alternatively, no more than 10%. For example, the petroleum ore can maintain an average temperature of greater than 200° F. (93° C.) during any removal of the susceptors, alternatively an average temperature of greater than 400° F. (200° C.).

Another advantage of the exemplary embodiments of the present disclosure can be that the susceptors can optionally be reused after they are removed from a heated mixture.

Alternatively, in certain instances it may be appropriate to leave some or all of the susceptors in some or all of the material of the mixture after processing. For example, if the susceptors are elemental carbon, which is non-hazardous and inexpensive, it may be useful to leave the susceptors in the mixture after heating, to avoid the cost of removal. For another example, a petroleum ore with added susceptor material can be pyrolyzed to drive off useful lighter fractions of petroleum, which are collected in vapor form essentially free of the susceptor material, while the bottoms remaining after pyrolysis may contain the susceptor and be used or disposed of without removing the susceptor.

Referring to FIG. 1, a flow diagram of an embodiment of the present disclosure is provided. A container 1 is included, which contains a first substance with a dielectric dissipation factor, epsilon, less than 0.05 at 3000 MHz. The first substance, for example, may comprise a petroleum ore, such as bituminous ore, oil sand, tar sand, oil shale, or heavy oil. A container 2 contains a second substance comprising mini-dipole susceptors. The mini-dipole susceptors may comprise any of the mini-dipoles discussed herein, such as carbon fibers, carbon fiber floc, or carbon cloth. A mixer 3 is provided for dispersing the second mini-dipole susceptor substance into the first substance. The mixer 3 may comprise any suitable mixer for mixing viscous substances, soil, or petroleum ore, such as a sand mill, soil mixer, or the like. The mixer may be separate from container 1 or container 2, or the mixer may be part of container 1 or container 2. A heating vessel 4 is also provided for containing a mixture of the first substance and the second substance during heating. The heating vessel may also be separate from the mixer 3, container 1, and container 2, or it may be part of any or all of those components. Further, an antenna 5 is provided, which is capable of emitting electromagnetic energy as described herein to heat the mixture. The antenna 5 may be a separate component positioned above, below, or adjacent to the heating vessel 4, or it may comprise part of the heating vessel 4. Optionally, a further component, filter 6 may be provided, which is capable of filtering substantially all of the second substance comprising mini-dipoles from the first substance. Tailings 7 may then be removed or disposed of after filtration, while a heated petroleum product 8 may be stored or transported.

Figure 2:
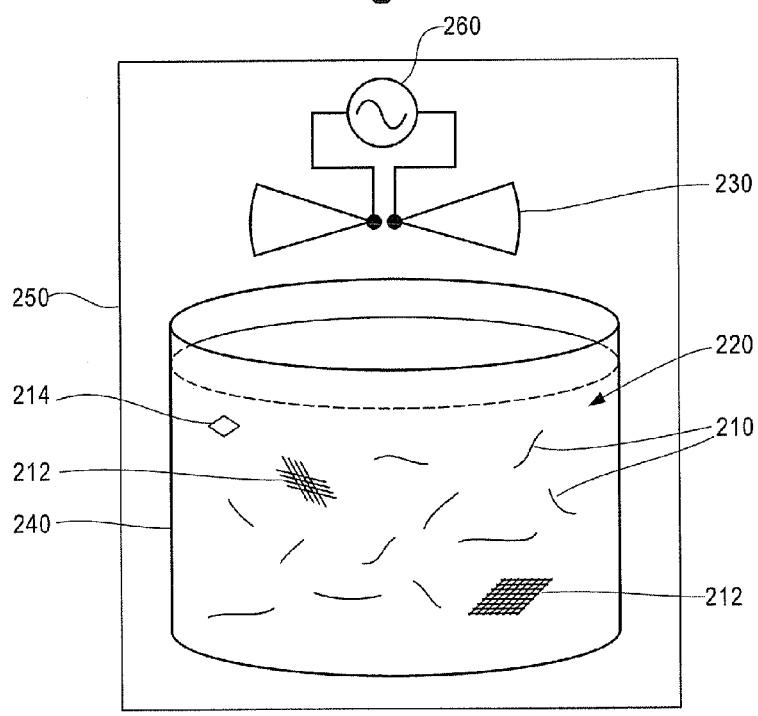
FIG. 2 illustrates mini-dipole and related susceptor structures distributed in a petroleum ore (not to scale), with associated RF equipment.

Referring to FIG. 2, an apparatus for RF heating petroleum ore is described. Mini-dipoles 210 are distributed in petroleum ore 220. The mini-dipoles may preferentially be formed of partially conductive carbon fibers. Fabric sections 212 may contain the carbon fibers of mini-dipoles 210, becoming unraveled to release the carbon fiber mini-dipoles. In another instance the fabric sections 212 may remain intact forming mini-loop antenna susceptors 214. The preferred carbon fibers may in practice comprise a variety of geometric forms while providing RF susceptance, antenna functionality, heat application to hydrocarbon ore 220. The petroleum ore 220 may contain any concentration of hydrocarbon molecules, which themselves may not be suitable susceptors for RF heating. An antenna 230 is placed in sufficient proximity to the mixture of mini-dipoles 210 and petroleum ore 220 to cause heating therein, which may be near field or far field or both. The antenna 230 may be a bowtie dipole although the invention is not so limited, and any form for antenna may be suitable depending on the trades. A vessel 240 may be employed, which may take the form of a tank, a separation cone, or even a pipeline. A method stirring the mix may be employed, such as a pump (not shown). Vessel 240 may be omitted in some applications, such as heating dry ore on a conveyor. RF shielding 250 can be employed as is common. Transmitting equipment 260 produces the time harmonic, e.g. RF, current for antenna 230. The transmitting equipment 260 may contain the various RF transmitting equipment features such as impedance matching equipment (not shown), variable RF couplers (not shown), and control systems (not shown).

Thus, enhanced RF heating of petroleum ores and hydrocarbons is provided by adding electrically conductive structures therein, such as thin carbon fibers or squares with sufficient electrical resistance. The conductive structures may provide antenna like properties, responding to electromagnetic fields and radio waves with electrical current flow thereupon for heating. A relatively small number or conductive structures may be sufficient as the effective aperture of a thin antenna can be much larger than its physical area.

EXAMPLES

The following examples illustrate several of the exemplary embodiments of the present disclosure. The examples are provided as small-scale laboratory confirmation examples. However, one of ordinary skill in the art will appreciate, based on the foregoing detailed description, how to conduct the following exemplary methods on an industrial scale.

Example 1

RF Heating of Petroleum Ore without Susceptor Addition

A sample of ¼ cup of Athabasca oil sand was obtained at an average temperature of 72° F. (22° C.). The sample was contained in a Pyrex glass container. A GE DE68-0307A microwave oven was used to heat the sample at 1 KW at 2450 MHz for 30 seconds (100% power for the microwave oven). The resulting average temperature after heating was 125° F. (51° C.).

Example 2

RF Heating of Petroleum Ore with the Addition of Carbon Fiber Susceptors

A sample of ¼ cup of Athabasca oil sand was obtained at an average temperature of 72° F. (22° C.). The sample was contained in a Pyrex glass container. 1 Tablespoon of carbon fiber floc (HexTow 1900/IM Chopped Carbon Fiber by Hexcell Corporation of Stamford Conn.) at an average temperature of 72° F. (22° C.) was added to the Athabasca oil sand and uniformly mixed. A GE DE68-0307A microwave oven was used to heat the mixture at 2450 MHz for 30 seconds. The resulting average temperature of the mixture after heating was 240° F. (115° C.).

Example 3

RF Heating of Petroleum Ore with Carbon Fiber Square Susceptors

A sample of ¼ cup of Athabasca oil sand was obtained at an average temperature of 72° F. (22° C.). The sample was contained in a Pyrex glass container. 1 Tablespoon of carbon fiber squares at an average temperature of 72° F. (22° C.) was added to the Athabasca oil sand and uniformly mixed. A GE DE68-0307A microwave oven was used to heat the mixture at 1 KW at 2450 MHz. The resulting average temperature of the mixture after heating was 180° F. (82° C.).

The invention claimed is:

1. A radio frequency (RF) heating composition comprising:
   a petroleum ore; and
   a plurality of carbon fibers mixed with said petroleum ore and comprising at least one of a plurality of individual carbon fibers, a plurality of carbon fiber floc pieces, and a plurality of carbon fiber cloth pieces.

2. The RF heating composition according to claim 1 wherein said petroleum ore comprises 10% to 90% by volume of a total volume of said petroleum ore and said plurality of carbon fibers.

3. The RF heating composition according to claim 1 wherein said plurality of carbon fibers comprises 1% to 50% by volume of a total volume of said petroleum ore and said plurality of carbon fibers.

4. The RF heating composition according to claim 1 further comprising less than 5% by volume of water.

5. The RF heating composition according to claim 1 wherein said petroleum ore comprises at least one of bituminous ore, oil sand, tar sand, oil shale and heavy oil.

6. The RF heating composition according to claim 1 wherein said plurality of carbon fibers comprises a plurality of individual carbon fibers averaging less than 5 cm in length and less than 0.5 mm in diameter.

7. The RF heating composition according to claim 1 wherein said plurality of carbon fibers comprises a plurality of individual carbon fibers averaging less than 1 cm long and less than 0.1 mm in diameter.

8. The RF heating composition according to claim 1 wherein said plurality of carbon fibers are in the form of carbon fiber cloth pieces averaging dimensions less than 5 cm by 5 cm by 0.5 mm.

9. The RF heating composition according to claim 1 wherein said plurality of carbon fibers are in the form of carbon fiber cloth pieces averaging dimensions less than 1 cm by 1 cm by 0.5 mm.

10. The RF heating composition according to claim 1 wherein said plurality of carbon fibers further comprises a plurality of graphite structural fibers.

11. A radio frequency (RF) heating composition comprising:
    a petroleum ore having a dielectric dissipation factor less than 0.05 at 3 GHz; and
    a plurality of carbon fibers mixed with said petroleum ore;
    said petroleum ore comprising 10% to 90% by volume of a total volume of said petroleum ore and said plurality of carbon fibers;
    said plurality of carbon fibers comprising 1% to 50% by volume of the total volume of said petroleum ore and said plurality of carbon fibers.

12. The RF heating composition according to claim 11 wherein said petroleum ore has a dielectric dissipation factor less than 0.01 at 3 GHz.

13. The RF heating composition according to claim 11 further comprising less than 5% by volume of water.

14. The RF heating composition according to claim 11 wherein said petroleum ore comprises at least one of bituminous ore, oil sand, tar sand, oil shale and heavy oil.

15. The RF heating composition according to claim 11 wherein said plurality of carbon fibers comprises at least one of a plurality of individual carbon fibers, a plurality of carbon fiber floc pieces, and a plurality of carbon fiber cloth pieces.

16. The RF heating composition according to claim 11 wherein said plurality of carbon fibers comprises a plurality of individual carbon fibers averaging less than 5 cm in length and less than 0.5 mm in diameter.

17. The RF heating composition according to claim 11 wherein said plurality of carbon fibers are in the form of carbon fiber cloth pieces averaging dimensions less than 5 cm by 5 cm by 0.5 mm.

18. The RF heating composition according to claim 11 wherein said plurality of carbon fibers comprises a plurality of graphite structural fibers.

19. A radio frequency (RF) heating composition comprising:
    a petroleum ore; and
    a plurality of carbon fibers mixed with said petroleum ore and comprising at least one of a plurality of individual carbon fibers averaging less than 5 cm in length and less than 0.5 mm in diameter and a plurality of carbon fiber cloth pieces having dimensions averaging less than 5 cm by 5 cm by 0.5 mm.

20. The RF heating composition according to claim 19 wherein said petroleum ore comprises 10% to 90% by volume of a total volume of said petroleum ore and said plurality of carbon fibers.

21. The RF heating composition according to claim 19 wherein said plurality of carbon fibers comprises 1% to 50% by volume of a total volume of said petroleum ore and said plurality of carbon fibers.

22. The RF heating composition according to claim 19 further comprising less than 5% by volume of water.

23. The RF heating composition according to claim 19 wherein said petroleum ore comprises at least one of bituminous ore, oil sand, tar sand, oil shale and heavy oil.

24. A radio frequency (RF) heating composition comprising:
    a petroleum ore; and
    a plurality of carbon fibers mixed with said petroleum ore and having a dielectric dissipation factor less than 0.05 at 3 GHz.

25. The RF heating composition according to claim 24 wherein said petroleum ore comprises 10% to 90% by volume of a total volume of said petroleum ore and said plurality of carbon fibers.

26. The RF heating composition according to claim 24 wherein said plurality of carbon fibers comprises 1% to 50% by volume of a total volume of said petroleum ore and said plurality of carbon fibers.

27. The RF heating composition according to claim 24 further comprising less than 5% by volume of water.

28. The RF heating composition according to claim 24 wherein said petroleum ore comprises at least one of bituminous ore, oil sand, tar sand, oil shale and heavy oil.

29. The RF heating composition according to claim 24 wherein said plurality of carbon fibers further comprises a plurality of graphite structural fibers.

* * * * *